Dec. 4, 1951     H. WATERMAN     2,577,054
AUTOMATIC BROMINE WATER FEEDER
Filed June 24, 1946
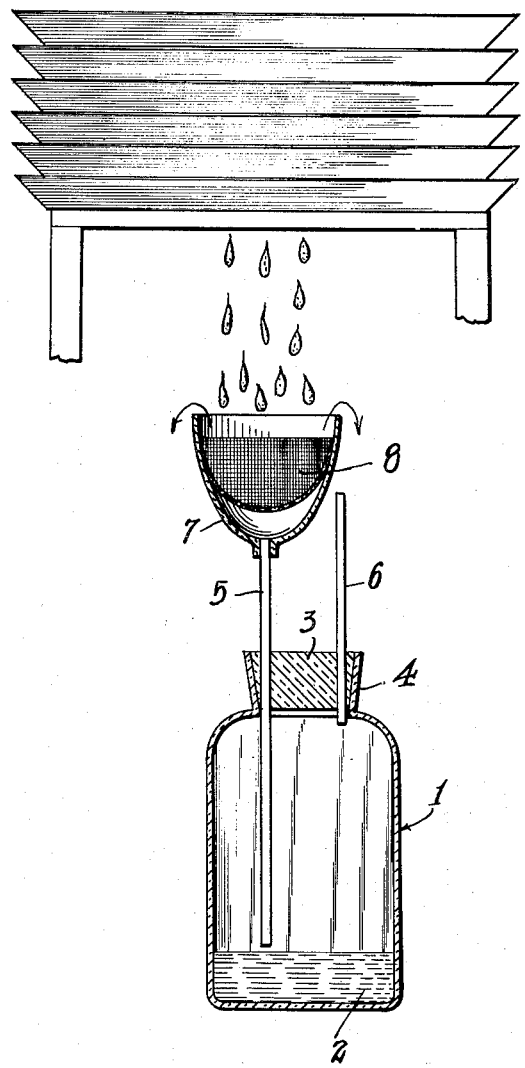
Inventor
Herbert Waterman Patented Dec. 4, 1951

2,577,054

UNITED STATES PATENT OFFICE 2,577,054

AUTOMATIC BROMINE WATER FEEDER

Herbert Waterman, Los Angeles, Calif., assignor to American Potash & Chemical Corporation, Trona, Calif., a corporation of Delaware Application June 24, 1946, Serial No. 678,771

2 Claims. (Cl. 210—29)

This invention relates to an apparatus for automatically and continuously feeding bromine water and is particularly directed to an apparatus designed to supply bromine water continuously in very small amounts.

In the operation of small cooling towers at present it is difficult to control algae and bacterial slimes. It is the practice to employ certain stable and nonvolatile chemicals, such as sodium pentachlorphenate. This chemical is added in high concentration to the cooling tower about once a month, but at the end of the month it is frequently found that an appreciable growth of organic matter exists, which impairs seriously the cooling system used in connection with the tower.

In the operation of small cooling towers, the daily loss of water from the tower frequently exceeds the total volumetric capacity of the tower so that no matter how much algicide is added at the beginning of the month, that remaining in the tower at the end of the month is very small, indeed. The proper method of control of the algicide is to add the algicide in a continuous manner, but because the amount required is so small, it has heretofore been found impracticable to provide an apparatus for automatically and continuously adding algicide. For large installations there are available commercial feeders for the automatic and continuous addition of algicide.

Bromine is effective as an algicide when added in proper quantities to the makeup water of a cooling tower. While the amount to be added is subject to considerable variation, about six parts per million should be employed in the average case. If, for example, the bromine is added as bromine water containing 3% of bromine, about 200 parts per million of the bromine water is required. Accordingly, in towers where the makeup water used at a rate of one pound per minute, approximately one-tenth of a milliliter per minute of bromine water is required. Many towers are in operation which require only one-tenth of a pound of makeup water per minute, and for such towers only one one-hundredth of a milliliter per minute is required. As far as known, there has heretofore been available no apparatus capable of supplying such small amounts in a reliable manner. Accordingly, bromine water has not heretofore been popular as an algicide in the control of bacterial slimes for cooling towers.

It is the general object of the present invention to provide an apparatus for automatically supplying bromine water which is capable of supplying the small amount required, for example, by cooling towers, which apparatus is simple, inexpensive, and foolproof.

The apparatus of the present invention will be fully understood from the following description of the preferred form or example of an apparatus embodying the invention, in which The figure is an elevation, mainly in section.

Referring to the drawing, the feeder of the present invention includes a container 1, preferably being in the form of a glass bottle, and on the bottom of the container there is provided a layer of liquid bromine 2. A stopper 3, also preferably of glass, closes the neck 4 of the bottle 1. Through the stopper 3 two tubes 5 and 6 pass. The first of these tubes is the capillary 5 which reaches almost to the bottom of the bottle 1, terminating preferably just above the top of the bromine layer 2. The upper end of the capillary 5 is connected to a funnel 7 in which there is placed a filtering media 8, the purpose of which is to remove any particles in the liquid flowing through the capillary 5.

The other tube 6 through the stopper 3 terminates just below the neck 4 of the bottle 1. The upper end of tube 6 terminates slightly below the upper rim of the funnel 7, the distance between these two points serving to provide a hydraulic head for driving, as hereinafter pointed out, fluid through the device.

In the use of the apparatus of the present invention, the complete assembly with the bottle 1 filled with bromine water, is placed in position below the drip of liquid falling through the tower so that the funnel 7 may overflow continuously and so that the fluid discharged from the upper end of the tube 6 will enter the pan of the cooling tower. There is thus provided in the use of the present invention a predetermined hydraulic head—the distance between the upper rim of the funnel 7 and the upper end of the tube 6—which forces the fluid down continuously through the capillary tube 5, thereby forcing the bromine impregnated fluid in the bottle 1 upwardly through the tube 6, and thus causing the bromine water to continuously enter the pan of the tower. In the bottle 1 the water is kept substantially constant with regard to bromine concentration, by diffusion of bromine from the bromine layer. The concentration is maintained practically constant when the apparatus is mounted as described in a water-cooling tower so that the temperature of operation is substantially constant. The rate of feed of bromine water may be readily altered as required by the particular cooling tower being serviced by the device in various manners. For example, the size of the capillary opening of the tube 5, or the length of the tube, may be altered to thereby alter the flow rate through the device, or the head maintained between the upper rim of the funnel 7 and the top of the tube 6 may be altered. In practical operation it has been found a simple matter to regulate the rate of feed over a wide range in the manner described. It has also been found possible to regulate the device so that as little as one-hundredth of a milliliter per minute of the bromine water may be reliably fed to the pan of the cooling tower. There is really no upper limit to the rate of feed.

With the automatic bromine apparatus herein described, it is possible to install the apparatus for operation so that very infrequent attention is necessary. In practical operation adequate control of the algicides is effected, the only attention required for the apparatus being to replenish the bromine and change or clean the filtering medium from time to time.

While the particular form of the apparatus herein described is well adapted for carrying out the objects of the present invention, various modifications and changes may be made, and this invention includes all such modifications and changes as come within the scope of the appended claims.

I claim:

1. An automatic bromine water feeder comprising, a closed container adapted to hold a layer of bromine and a super-imposed layer of bromine water into which the bromine from the bromine layer enters by diffusion, an inlet to the container comprising a capillary tube having a funnel at its upper end, said funnel being exterior to and above the container, and the capillary tube extending into the lower end of the container, and a discharge tube from the container having an inlet near the top thereof, and an outlet above the container and below the rim of said funnel.

2. An automatic bromine water feeder comprising, a closed container for holding a layer of bromine and a super-imposed layer of bromine water into which the bromine from the bromine layer enters by diffusion, a capillary tube extending into the container in position to terminate near but above the bromine layer, such capillary tube extending exterior of the container and there terminating in an overflow funnel having a rim disposed above the container, and said feeder having an outlet whose entrance end leaves the container at a point above the discharge point of the capillary tube and whose outlet end is above the container and below the rim of the overflow funnel.

HERBERT WATERMAN.

REFERENCES CITED

The following references are of record in the file of this patent:

UNITED STATES PATENTS

| Number | Name | Date |
| --- | --- | --- |
| 1,392,862 | Tuttle et al. | Oct. 4, 1921 |
| 1,434,251 | Martino | Oct. 31, 1922 |
| 1,796,407 | Shuldener | Mar. 17, 1931 |
| 1,904,157 | Martin | Apr. 18, 1933 |
| 1,995,639 | Henderson | Mar. 26, 1935 |
| 2,023,552 | Savage | Dec. 10, 1935 |
| 2,277,320 | Gygax | Mar. 24, 1942 |
| 2,306,027 | Swaney | Dec. 22, 1942 |
| 2,392,235 | Edwards | Jan. 1, 1946 |
| 2,392,236 | Edwards | Jan. 1, 1946 |